United States Patent [19]
Valyi

[11] 4,067,944
[45] Jan. 10, 1978

[54] METHOD FOR OBTAINING MULTILAYERED HOLLOW PLASTIC ARTICLE

[76] Inventor: Emery I. Valyi, 5200 Sycamore Ave., Riverdale, N.Y. 10471

[21] Appl. No.: 627,001

[22] Filed: Oct. 29, 1975

Related U.S. Application Data

[60] Division of Ser. No. 519,834, Nov. 1, 1974, which is a continuation-in-part of Ser. No. 338,362, March 5, 1973, abandoned.

[51] Int. Cl.$^2$ ............................................. B29C 17/07
[52] U.S. Cl. .................................... 264/89; 264/97; 264/296; 425/523; 425/530
[58] Field of Search ................... 264/89, 90, 92, 94, 264/97, 296; 425/DIG. 208, DIG. 209, DIG. 215, DIG. 234, 523, 530, 533, 534

[56] References Cited

U.S. PATENT DOCUMENTS

| 3,247,550 | 4/1966 | Haines, Jr. ........................ 264/89 X |
| 3,364,521 | 1/1968 | Valyi ................................. 264/97 X |
| 3,770,860 | 11/1973 | Amberg et al. ................... 264/94 X |
| 3,776,991 | 12/1973 | Marcus ................................ 264/89 |

FOREIGN PATENT DOCUMENTS

| 1,950,212 | 4/1971 | Germany .............................. 264/97 |
| 46-29980 | 8/1971 | Japan ................................... 264/97 |

Primary Examiner—Jan H. Silbaugh
Attorney, Agent, or Firm—Robert H. Bachman

[57] ABSTRACT

A method for obtaining a multilayered, hollow plastic article having side walls which are oriented in the axial, radial and tangential directions. Plastic material is injection molded about a liner covered core to form a multilayered parison which is then transferred on the core to first and second blow molds for blow molding to a hollow article. A parison mold and core are maintained in axial alignment and the liner and blow molds are moved therebetween for engagement with the core.

9 Claims, 10 Drawing Figures

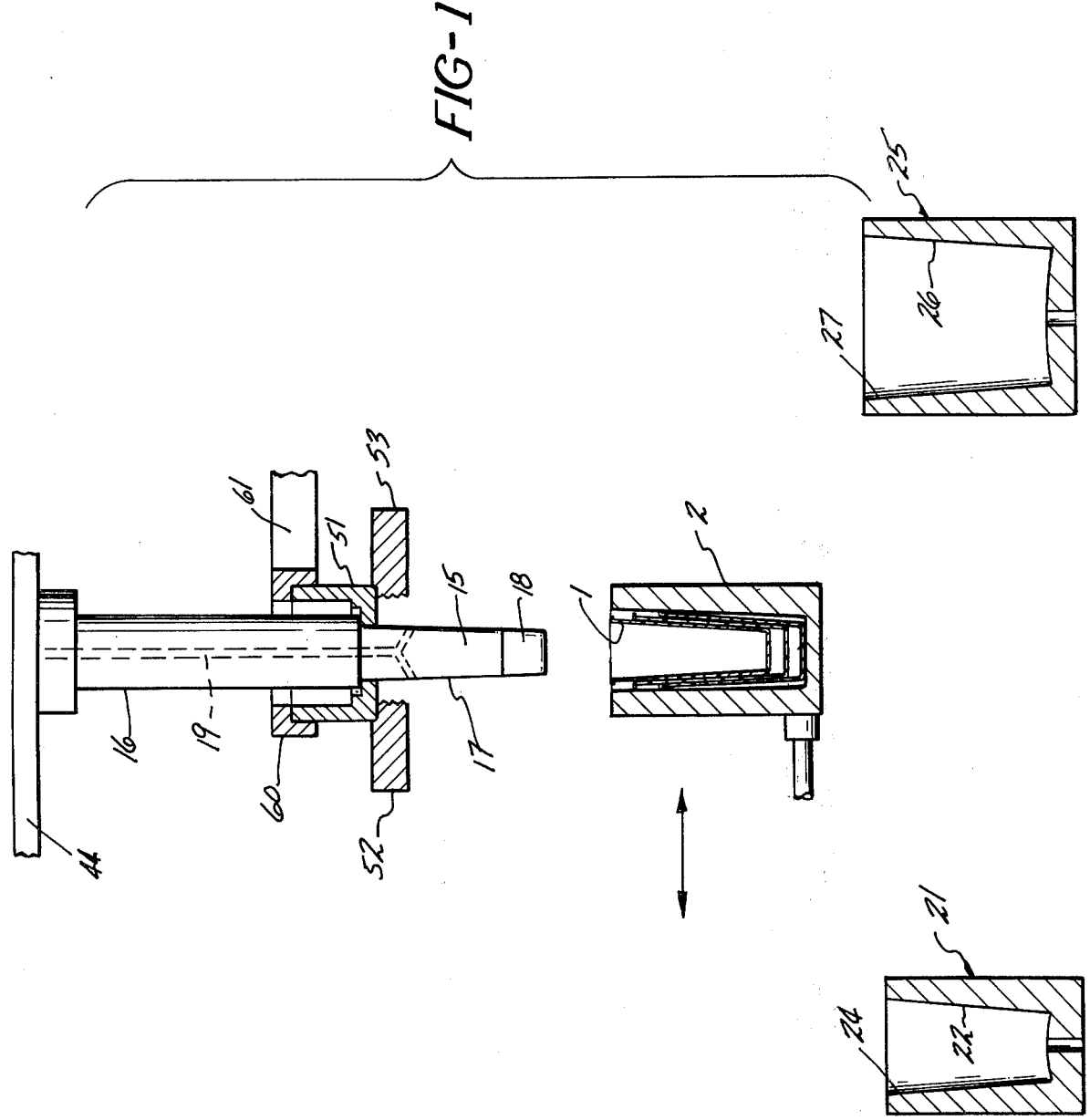

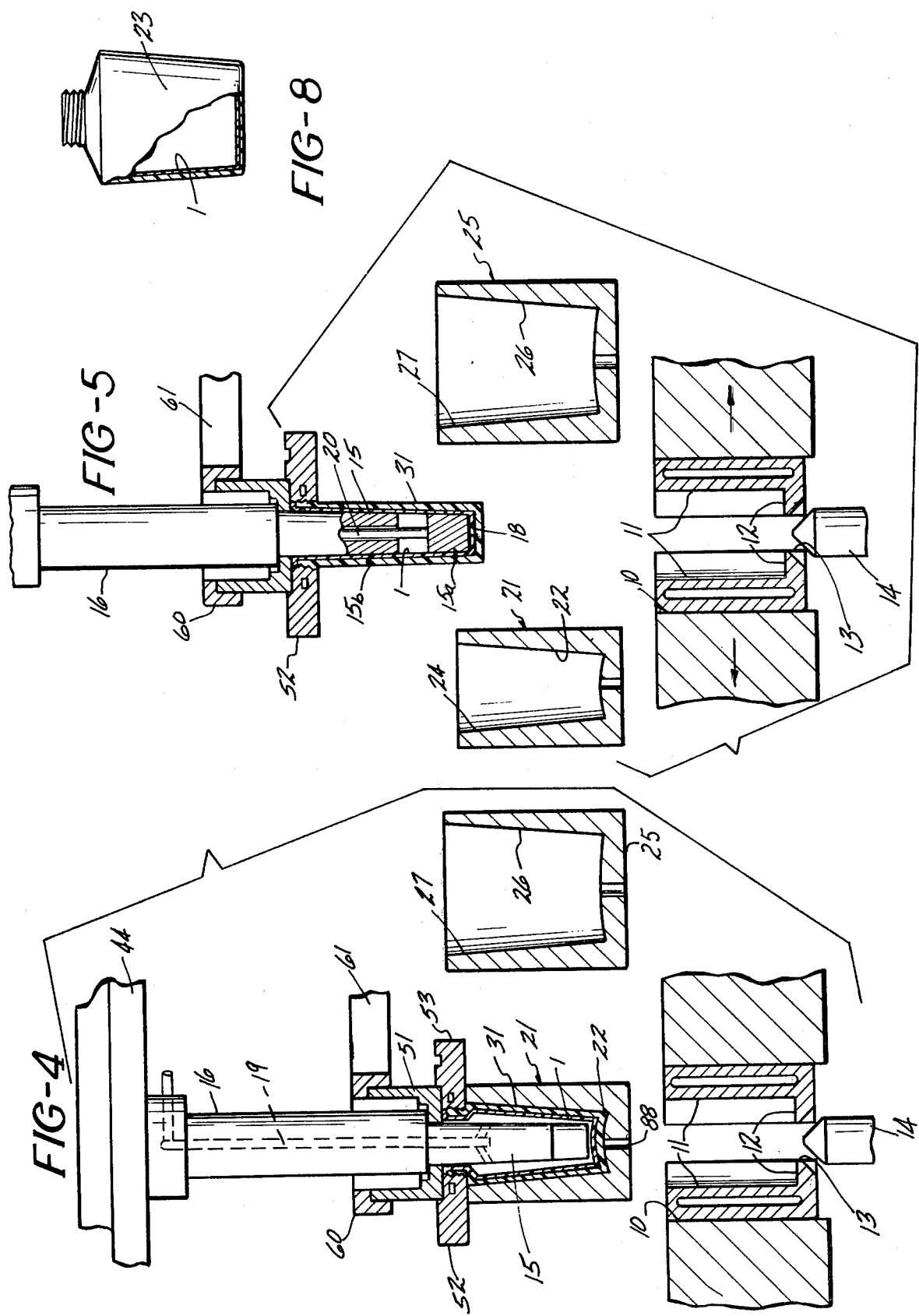

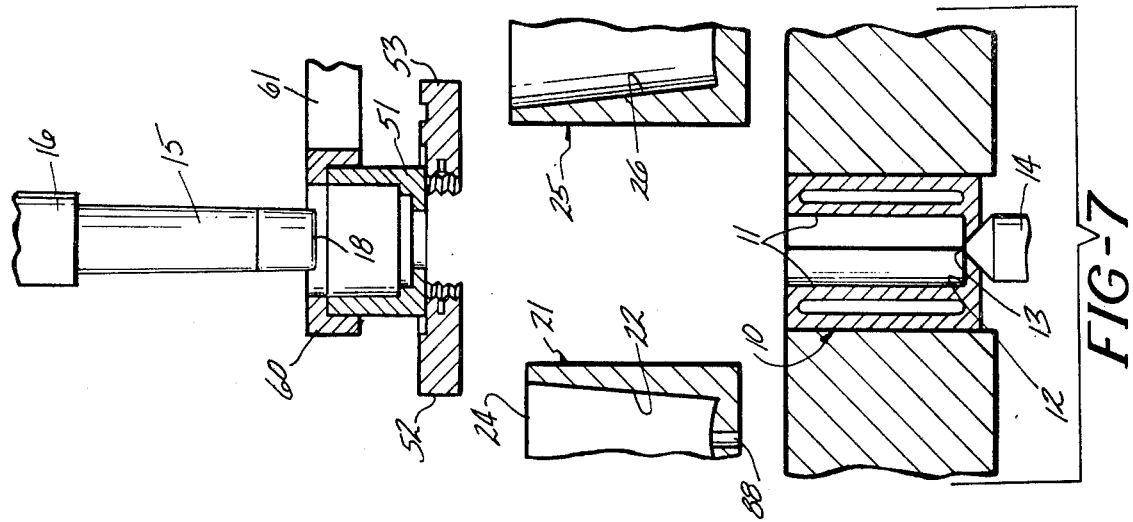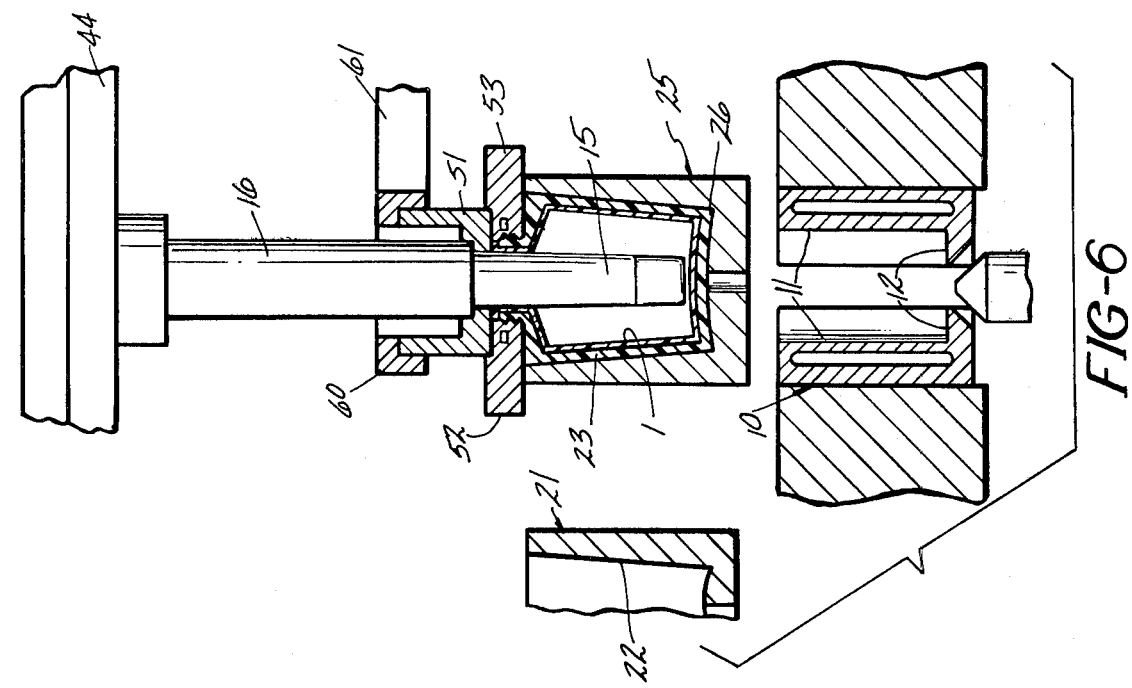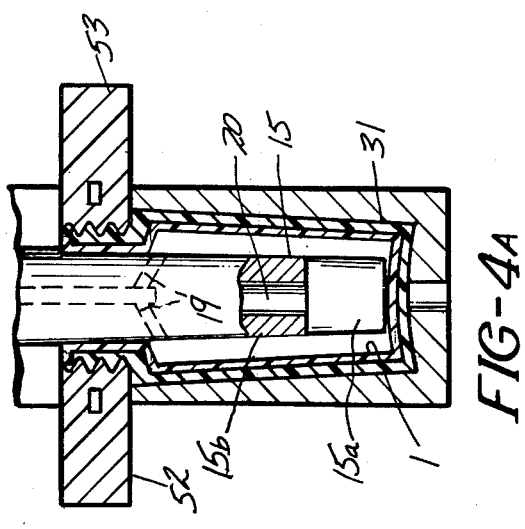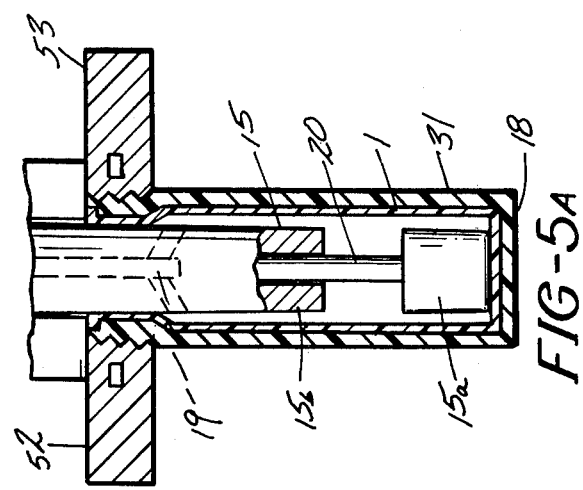

METHOD FOR OBTAINING MULTILAYERED HOLLOW PLASTIC ARTICLE

CROSS REFERENCE TO RELATED APPLICATIONS

This application is a division of application Ser. No. 519,834, filed Nov. 1, 1974, which is a continuation-in-part of copending application SN 338,362 now abandoned, for Method and Apparatus for Making Oriented Hollow Plastic Articles, filed March 5, 1973 by Emery I. Valyi.

BACKGROUND OF THE INVENTION

This invention relates to the art of blow molding articles of organic plastic material from a parison and has for its principal object a method for obtaining improved, oriented hollow articles.

The art teaches various methods and apparatus for obtaining blow molded articles of organic plastic material from a parison, such as in U.S. Pat. No. 3,349,155 and Re. 27,104. Generally, these methods are characterized by forming a parison in a parison mold on a blow core, placing said formed parison and blow core into a blow mold and expanding said parison in the blow mold by means of fluid pressure.

Naturally, the blowing procedure inherently produces orientation in the plastic due to expansion in a radial direction; however, it is highly desirable to produce orientation in the axial direction as well. Heretofore, this has been done by re-heating the parison and, before blowing, axially orienting the parison, such as by stretching.

Such known methods are subject to disadvantages, such as the difficulty of maintaining uniform wall thickness. Obviously, control of wall thickness is quite important. Other difficulties include insufficient control of the parison dimensions and degree of orientation and time consuming and inconvenient operations.

This invention particularly relates to lined hollow articles formed from composite parisons having a preformed inner sleeve or lining, such as described in my prior U.S. Pat. Nos. 3,719,735 and 3,717,544. According to said patents, a previously formed, sleeve-like liner is applied to a blow core of an injection blow molding apparatus, plastic is injected around said liner while upon the core and the resultant composite parison, consisting of the liner and the injected plastic is expanded together into conformity with a blow mold.

It is highly desirable to obtain a lined article as aforesaid, wherein both layers of the article have orientation in the axial as well as radial direction. It is also desirable to produce such an oriented, lined hollow article simply and conveniently, without the disadvantages known heretofore.

Accordingly, it is a principal object of the present invention to provide a method for obtaining a lined hollow, plastic article having orientation in the axial, radial and tangential directions.

It is a further object of the present invention to provide a method as aforesaid which is simple and convenient to utilize, readily adapted to commercial operation and results in an improved, oriented hollow plastic article.

Further objects and advantages of the present invention will appear from the ensuing specification.

SUMMARY OF THE INVENTION

In accordance with the present invention, it has now been found that the foregoing objects and advantages may be readily obtained. The present invention provides a multilayered, hollow plastic article having a bottom wall, side walls and an integral neck portion with an opening therein, said article having an inner seamless, preferably drawn first thermoplastic portion and an outer second portion of a seamless pressure molded thermoplastic material, the two portions being adhered one to the other substantially over their entire contacting areas, wherein said side walls are oriented in the axial, radial and tangential directions.

The method of the present invention forms a parison on a core in a parison mold by molding plastic material around the core in the parison mold cavity and subsequently expands the parison in a blow mold. The improvement of the present invention comprises providing an inner liner of organic plastic material on said core, pressure molding an outer layer of organic plastic material around said liner to form a composite parison, partially expanding said composite parison to free it from surface contact with said core, axially extending said partially expanded composite parison and finally expanding the partially expanded, axially extended composite parison in a blow mold to form the article of the present invention.

It can be readily seen that the hollow article of the present invention is characterized by highly improved properties by virtue of the fact that the walls thereof are controllably oriented in the radial, axial and tangential directions. It is particularly advantageous that the layers of the article of the present invention are all characterized by the foregoing orientation, while at the same time being adhered to each other substantially over their entire contacting areas. Thus the hollow article of the present invention provides the desirable properties which characterize each of the layers thereof, while improving the properties thereof by said orientation. It is known that orientation substantially improves the significant properties of plastics, as clarity, impact resistance, strength, resistance to permeation, etc. Among the plastics that can be so improved are polystyrene, polyvinyl chloride, polyolefins as polyethylene and polypropylene, polyesters, polyamides, acrylics, acrylonitrile and methacrylonitrile polymers. The controlled orientation in the radial, axial and tangential direction, which characterizes the layers of the multilayered article of the present invention, therefore represents a significant advantage, and an advantage which is obtained in a simple and expeditious manner.

BRIEF DESCRIPTION OF DRAWINGS

The nature of the invention will be better understood from the following description, taken in conjunction with the accompanying drawings in which a specific embodiment has been shown for purposes of illustration. In the drawings:

FIG. 1 is an elevation, partly in section, showing the blow core in position for receiving the liner;

FIG. 4 is a view similar to FIG. 1 showing the blow core in position in the pre-forming mold, with the parison pre-formed;

FIG. 4A is an enlarged sectional view showing the blow core and parison of FIG. 3;

FIG. 5 is a view similar to FIG. 1 showing the blow core retracted and the parison axially extended;

FIG. 5A is an enlarged sectional view showing the blow core and parison of FIG. 5.

FIG. 6 is a view similar to FIG. 1 showing the blow core in blow position in the blow mold, with the axially extended parison blown;

FIG. 7 is a view similar to FIG. 1 showing the blow mold in discharge position and the blow core retracted; and FIG. 8 is a sectional view showing the improved article prepared in accordance with the present invention.

DETAILED DESCRIPTION

Figure 3:
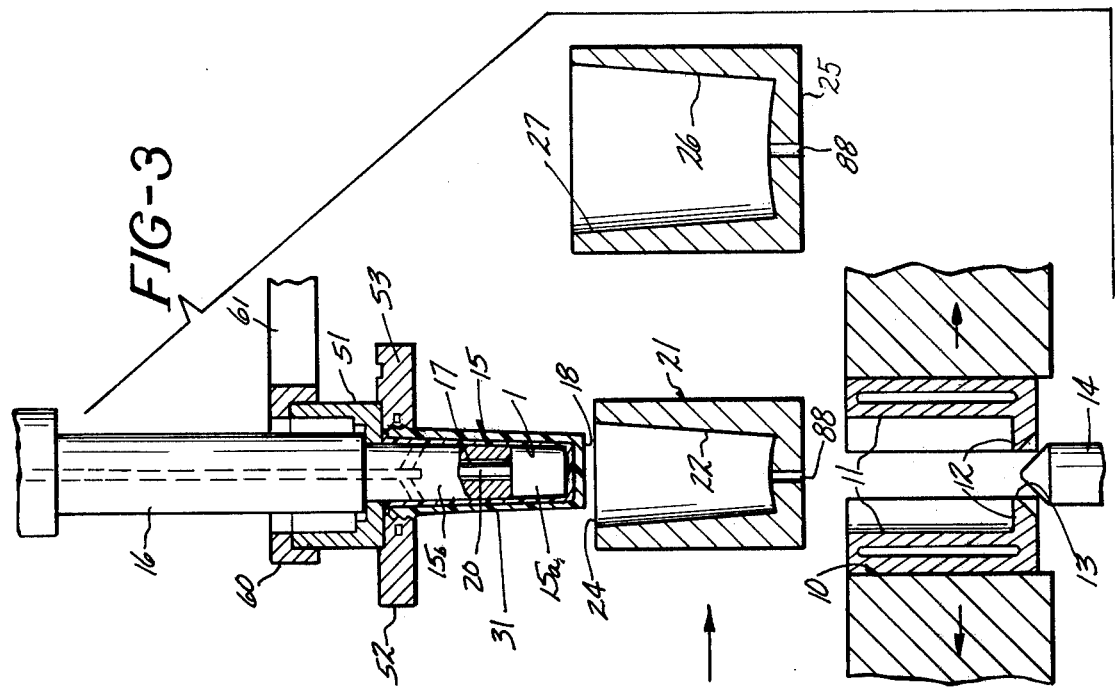
FIG. 3 is a view similar to FIG. 1 showing the blow core retracted and the pre-forming mold in position.

Referring to the drawings in more detail, the blow core 15 is carried on a rod 16 and is formed with a surface 17 and an end wall 18. The blow core 15 is provided with the usual blow passages 19 for admitting pressure fluid to expand the parison into the form of the finished article, or for providing suction to hold the liner thereon. The blow core rod 16 is connected to be actuated by a cross head 44 and a suitable cylinder for advancing and retracting the blow core to its various operating stations.

A plurality of liners 1 are held in magazine 2. The magazine 2 may be shifted transversely into and out of the path of blow core 15 for applying the liner 1 to the blow core 15. The blow core is inserted into the liner 1, the liner held thereon by suction applied through passages 19, the blow core carrying liner retracted, the magazine 2 shifted out of the path of the blow core 15 and the blow core carrying liner inserted into the parison die 10 as shown in FIG. 2.

If a neck ring is required, it may be split and compoased of members 52 and 53 and mounted on a carrier 51 and may be connected to be shifted by a sleeve 60, cross head 61 and suitable hydraulic cylinder connected thereto, not shown. At the liner receiving station shown in FIG. 1, the neck ring is disposed spaced from the walls 17 of the blow core 15 to provide room for receiving the liner 1 on the blow core; whereas at the parison injection station in parison injection position shown in FIG. 2, the neck ring is disposed adjacent the walls 17 of the blow core 15 and is adapted to shape the neck of the parison and of the resulting blown article, as into an externally threaded configuration.

Figure 2:
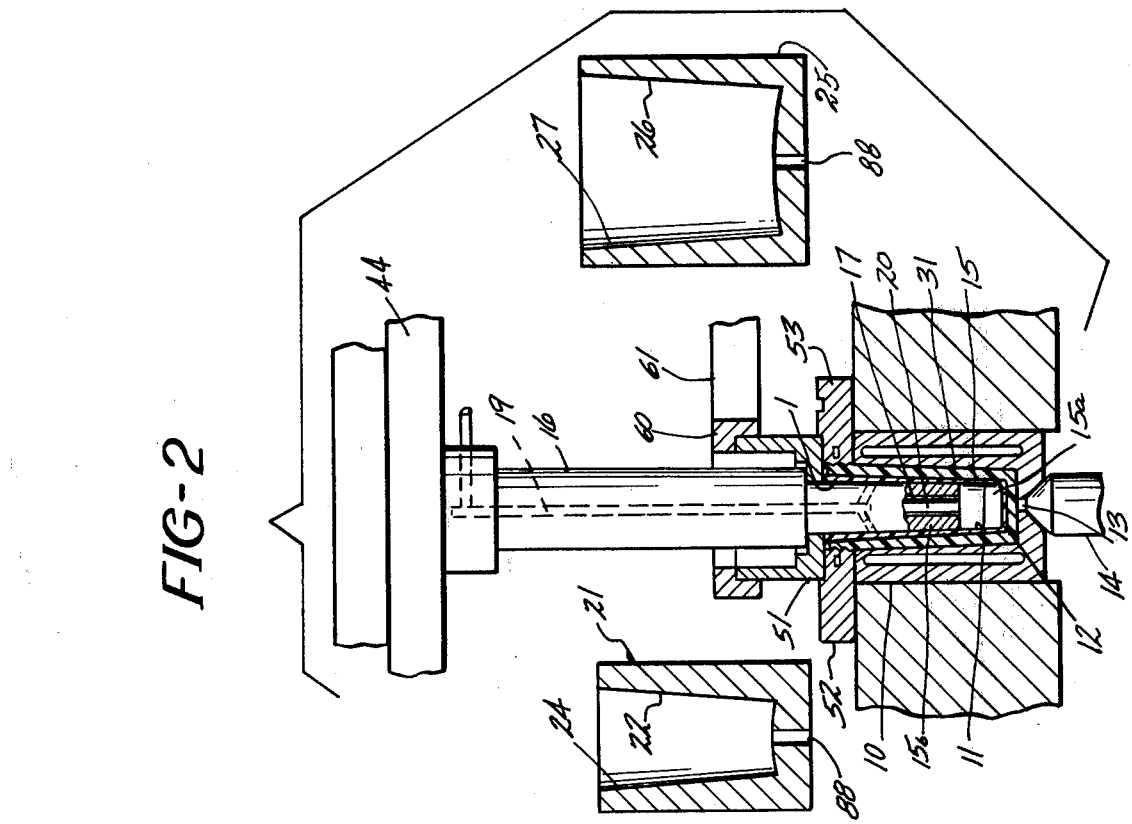
FIG. 2 is a view similar to FIG. 1 showing the blow core in parison forming position in the parison die.

The parison die 10 shown in FIG. 2 has outer walls 11, which may be separable, depending on the shape of the parison, adapted to form the outer surface of the parison walls and has an end wall 12 shaped to form the end wall of the parison. The end wall of the parison die has an injection opening 13 registering with an injection nozzle 14 through which the organic plastic material is injected into the parison die around the liner 1 to form the composite parison 31, the parison die 10 is shown as split for convenience in opening to release the formed parison.

A wide variety of plastic materials may be used in the present invention. Thus, as discussed in my prior U.S. Pat. Nos. 3,719,735 and 3,717,544, one may select the material of the liner so as to have one of the properties that the finished article is to have and the material of the injected plastic so as to have another of the desired properties. The liner may, if desired, contain several layers of laminations to provide a liner having the combined properties of several plastics. Naturally, the deformation characteristics of all of said layers must be taken into consideration, such characteristics being known to those skilled in the art, and the step of axial extension must be conducted so as to be suitable for all of said layers at the same time.

Typical liner materials include the acetal polymers, polyolefins, ionomer resins, polyallomer copolymers, polystyrene, polyvinylidene chloride, polyvinyl chloride, polycarbonates, acrylonitrile, polyesters, etc.

Typical outer layers include the polyolefins, as polyethylene, polypropylene and copolymers thereof, polyvinyl chloride, polystyrene, acrylonitrile, methacrylonitrile, polyvinylidene chloride, polycarbonates, polyesters, polyamides, etc.

The plastics contemplated in accordance with the present invention are those whose properties are improved by orientation. If desired, the layers may be colored differently, or the liner provided with a decoration or printing in which case the outer layer should be transparent or translucent so that the decoration or printing is visible therethrough.

The liner is preferably a preformed, drawn plastic, such as by thermoforming or other methods well known in the art for manufacturing thin-walled, shaped plastic articles. This allows the liner to be previously prepared and stored until needed. Alternatively, the liner may be fashioned in place in line in the processing cycle, or formed by pressure molding in the processing cycle.

Referring to FIG. 2, the blow core 15 is shown to have an anterior portion 15a and a posterior 15b, with the anterior portion 15a being arranged to be axially reciprocable by means of piston 20, actuated by suitable means, not shown, as shown more clearly in FIGS. 5 and 5A to be described hereinbelow.

A pre-forming mold 21 is formed with a cavity 22 shaped to provide constraint for the partial expansion of the parison at the pre-forming station and having opening 24 on one side thereof to receive the blow core 15. Similarly, a blow mold 25 is provided formed with a cavity 26 shaped to form the finished article, such as a bottle 23, also having on one side an opening 27 to receive the blow core 15 and preformed parison. Naturally, the pre-forming mold 21 and/or the blow mold 25 may be made of one piece, or constructed as split, two-piece molds if desired. Also, if desired, the separate pre-forming mold 21 may be omitted, the parison introduced directly into blow mold 25 and the pre-forming operation conducted at the blow mold.

FIG. 2 shows the parts in the parison injection station, with the blow core 15 in the parison die 10, the neck ring carrier 51 adjacent the parison die with both the pre-forming mold 21 and the blow mold 25 out of the path of the blow core. With the parts in this position, the plastic material is injected through the nozzle 14 into the injection cavity to form the parison 31. In the parison injection station shown in FIG. 2, the magazine 2 carrying liners 1 is not shown, being out of view.

The composite parison 31 thus formed is characterized by having an inner layer corresponding to the liner 1, and an outer layer corresponding to the injected plastic, with the two layers being adhered one to the other substantially over their entire contacting areas.

In the next step, shown in FIG. 3, the parison die 10 is opened to release the parison and the blow core with the neck ring, and the parison die separated therefrom sufficiently to provide clearance for the pre-forming mold 21, which is then shifted transversely into the path of the blow core.

It should be understood that variations of this movement and the movements shown herein will readily occur to those skilled in the art. Thus, instead of being movable in an axial direction only, the blow core may be rotatably mounted and moved from liner receiving station, to injection station, to pre-forming station, to blow molding station. See, for example, U.S. Pat. Nos. 3,011,216 and 3,776,991.

In a fourth step, as shown in FIG. 4, the blow core with the neck ring is advanced into the pre-forming mold 21 and fluid is supplied under pressure through the blow core passages 19 to partially expand the parison so as to free it from surface contact with the blow core, as clearly shown in FIG. 4A. The purpose of this step is to avoid the difficulties heretofore encountered during axially extending the parison while in surface contact with the blow core. For example, if the parison is axially extended while in surface contact with the blow core it tends to thin out in localized regions due to the constraint caused by friction against the walls of the blow core. This results in erratic and unpredictable thinning which often leads to unnacceptable products. Also, the problem may be accentuated with a composite parison and result in separating the layers from each other.

Naturally, a pre-forming mold may at times be dispensed with in this step and the parison pre-formed without constraint by controlling the duration and/or degree of the fluid pressure. Alternatively, this step may be performed in the blow mold whereby the parison is first preformed within the confines of the blow mold without expanding it into conformity therewith. The parison is then axially extended to reach the length of the blow mold cavity and only then is it expanded into full conformity with the blow mold.

In the fifth step, as shown in FIG. 5, the parison is axially extended by moving the anterior portion 15a of the blow core 15 in an axial direction by means of piston 20 as clearly shown in FIG. 5A. Alternatively, if desired, the same effect can be achieved by moving the entire blow core 15 in an axial direction. This step conveniently stretches the parison longitudinally before blowing, without the problems noted heretofore, and thereby produces orientation of both layers in the axial direction as well as the orientation subsequently produced by blowing. It can be seen that reheating is not required and frictional discontinuities are avoided. In this step both the pre-forming mold and the blow mold are spaced from the blow core.

In the sixth step, as shown in FIG. 6, the blow core with the neck ring and with the axially extended parison is positioned in the blow mold 25 and fluid is supplied under pressure through the blow core passages to blow the pre-formed and axially extended parison into the form of the blow mold cavity 26 to form the bottle 23. Depending upon the shape of the pre-formed and axially extended parison, it may be so positioned through the neck opening of the blow mold, or the blow mold may be opened to admit the parison.

When the article has cooled to its proper state, the neck ring members 51 and 52 are separated, the neck ring carrier 51 retracted and the blow mold is shifted out of the path of the blow core into discharge position as shown in FIG. 7, wherein the finished article is extracted therefrom. During the extraction step, the blow core is returned to the liner receiving station as shown in FIG. 1 for the next cycle. Extraction of the article may be facilitated by applying air pressure or mechanical actuators, such as ejector pins, through opening 88.

It can be readily seen that the finished article of the present invention is characterized by many advantages. In particular, the side walls of the inner and outer portions are controllably oriented in the axial, radial and tangential directions, without longitudinal discontinuities or thinning in either portion, which orientation enhances the physical properties and resistance to gas transmission. The inner and outer portions are adhered to each other substantially throughout their contacting surfaces.

As part of the method according to the present invention, it is possible to carry out the steps of axial and/or radial orientation at the temperatures that are suited to produce the best properties in a given plastic. Thus, a cooling dwell may be introduced before axially extending the parison. Alternatively, the parison or predetermined regions thereof may be heated to reduce the degree of orientation in such regions.

Naturally, the present invention is quite versatile and a wide variety of articles of varying configurations may be readily prepared. If desired, the present invention may be performed in an operation the individual steps of which may be separated in time, or performed without interruption on a continuous basis. For example, if the process is interrupted at a convenient stage, the product stored or shipped to another location and the process subsequently completed, such as when shipping a molded parison from one location to another.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

I claim:

1. In the method of making a hollow plastic article wherein a parison is formed on a core in a parison mold by molding the plastic material around the core in the parison mold cavity and wherein the parison is subsequently expanded in a blow mold, the improvement which comprises: providing a preformed, drawn inner liner of organic plastic material; bringing said liner and core into axial alignment with each other; engaging said core and liner by relative axial movement between the core and liner to transfer said liner to said core; engaging said liner covered core and parison mold by relative axial movement between the core and parison mold; pressure molding an outer layer of organic plastic material around said liner in said parison mold to form a composite parison; providing a second mold; bringing the second mold and composite parison covered core into axial alignment with each other; engaging said second mold and composite parison covered core by relative axial movement between the second mold and core; freeing said composite parison from surface contact with said core in said second mold; bringing said freed parison on said core and said blow mold into axial alignment with each other; engaging said freed parison covered core and said blow mold by relative axial movement between the blow mold and core; axially extending said freed parison; and finally expanding said freed parison in said blow mold to form a multilayered, oriented, composite, hollow article, wherein the parison mold and core are maintained in axial alignment with each other, and wherein the liner, second mold, and blow mold are moved between said parison mold and core for axial alignment with said core.

2. A method according to claim 1 wherein a plurality of said liners are held in a magazine, said magazine and core are brought into axial alignment, and said core and a liner in said magazine are engaged by relative axial movement between core and liner to transfer a liner to said core.

3. A method according to claim 1 wherein said composite parison is freed from surface contact with said core by partially expanding said composite parison in said second mold.

4. A method according to claim 1 wherein said core is moved axially into engagement with a liner, into engagement with said parison mold, into engagement with said second mold, and into engagement with said blow mold.

5. A method according to claim 4 wherein each of said liner, second mold and blow mold are moved laterally into axial alignment with said core.

6. A method according to claim 1 wherein said core is a blow core and wherein said blow core axially extends said freed parison.

7. A method according to claim 1 wherein the composite parison is cooled or heated prior to being axially extended.

8. A method according to claim 7 wherein a predetermined region of the composite parison is heated prior to axially extending the composite parison.

9. A method according to claim 1 wherein the neck of the parison is confined while the parison is freed, axially extended and finally expanded.

* * * * *